(12) United States Patent
Krishnamoorthy et al.

(10) Patent No.: US 7,859,244 B1
(45) Date of Patent: Dec. 28, 2010

(54) SELF CONFIGURING VOLTAGE REGULATORS

(75) Inventors: Ravishanker Krishnamoorthy, Singapore (SG); Rudy Kurniawan, Singapore (SG)

(73) Assignee: Marvell International Ltd., Hamilton (BM)

( * ) Notice: Subject to any disclaimer, the term of this patent is extended or adjusted under 35 U.S.C. 154(b) by 63 days.

(21) Appl. No.: 12/331,283

(22) Filed: Dec. 9, 2008

Related U.S. Application Data

(60) Provisional application No. 61/014,114, filed on Dec. 17, 2007.

(51) Int. Cl.
*G05B 24/02* (2006.01)

(52) U.S. Cl. ................................ 323/351; 323/224

(58) Field of Classification Search .............. 323/224, 323/283, 349, 351
See application file for complete search history.

(56) References Cited

U.S. PATENT DOCUMENTS

| | | | |
|---|---|---|---|
| 5,589,719 A * | 12/1996 | Fiset | 307/131 |
| 6,696,771 B2 * | 2/2004 | Acharya et al. | 307/140 |
| 7,378,829 B2 * | 5/2008 | Williamson et al. | 323/349 |

\* cited by examiner

*Primary Examiner*—Shawn Riley

(57) ABSTRACT

Some of the embodiments of the present invention provide a voltage regulator comprising a first driver, a second driver, and a controller configured to control the first driver and the second driver to selectably operate in one of a plurality of operating modes, including an external driver mode and an internal driver mode, wherein which one of the plurality of operating modes is selected is based on presence or absence of one or more external drivers. Other embodiments are also described and claimed.

28 Claims, 7 Drawing Sheets

SELF CONFIGURING VOLTAGE REGULATORS

CROSS REFERENCE TO RELATED APPLICATIONS

The present application claims priority to U.S. Patent Application No. 61/014,114 filed Dec. 17, 2007, entitled "SELF CONFIGURING VOLTAGE REGULATOR," the entire specification of which is hereby incorporated by reference in its entirety for all purposes, except for those sections, if any, that are inconsistent with this specification.

TECHNICAL FIELD

Embodiments of the present invention relate to the field of voltage regulators, and more particularly, to self configuring voltage regulators.

BACKGROUND

All electronic circuits need a well regulated power supply to ensure proper operation of the circuit, which may be supplied by one or more voltage regulators. It may be possible to integrate a voltage regulator into an integrated circuit (IC) chip. It may also be possible to integrate a voltage regulator to other components of an integrated circuit. For example, in a hard disk drive (HDD), one or more voltage regulators may be integrated into a motor controller, which may provide one or more regulated supplies to the motor controller and/or other components or chips in the HDD (e.g., system-on-chip (SoC), preamplifiers, dynamic random access memory (DRAM) etc.).

FIG. 1 illustrates an exemplary on-chip voltage regulator 10, along with internal field effect transistor (FET) drivers, included in an integrated circuit chip 20. The voltage regulator 10 may be configured to supply regulated voltage to load 76 through an inductor 72 and/or a capacitor 74. In various embodiments, a dotted line 14 in FIG. 1 may indicate a boundary of the chip 20, and the load 76, inductor 72 and/or capacitor 74 may be external to the integrated circuit chip 20. It will be apparent to those skilled in the art that although the voltage regulator 10 is illustrated to supply regulated voltage to components external to the chip 20, in various embodiments, the voltage regulator 10 may also drive components internal to the chip 20 along with (or instead of) driving the external load 76.

In various embodiments, the voltage regulator 10 may include a driver 28, which may further include a high side driver 32 and a P-channel FET (PFET) driver 34. The high side driver 32 may be configured to drive the PFET driver 34, and hence, for illustrative purposes, the high side driver 32 and the PFET driver 34 have been illustrated as a single unit. It will be apparent to those skilled in the art that unlike the illustration of FIG. 1, the high side driver 32 and the PFET driver 34 need not be physically combined. In various embodiments, the driver 28 may also include a low side driver 36 configured to drive an N-channel FET (NFET) driver 38, also included in the driver 28.

In various embodiments, the voltage regulator 10 may also include a controller 24, which may be configured to control the operations of the driver 28, including the high side driver 32 and the low side driver 36. The controller 24 may receive a reference voltage Vref, and the voltage regulator 10 may be configured to regulate its output voltage to make it substantially equal to k*Vref, where Vref is the reference voltage and k may be a programmable constant.

In various embodiments, the integrated circuit chip 20 may also include a VDD pin 40, which may be configured to receive a supply voltage VDD (e.g., 5V); a ground pin GND 48, which may be coupled to a ground supply GND; a feedback pin FB 52, which may be configured to receive a feedback voltage Vout supplied to the load 76 (or a voltage proportional to the feedback voltage Vout, for example, M*Vout, where M is a programmable constant); and an output voltage pin OUT 44, which may be configured to output the regulated voltage. In various embodiments, the supply voltage VDD may be coupled to the high side driver 32 and/or PFET driver 34, the ground voltage GND may be coupled to the low side driver 36 and/or NFET driver 38, and the feedback signal FB may be coupled to the controller 24. The output of the high side driver 32 and/or PFET driver 34 and the output of the low side driver 36 and/or NFET driver 38 may be coupled to the output pin OUT 44.

In various embodiments, the high side driver 32 may control the switching of the PFET driver 34 such that the PFET driver 34 drives the output pin OUT 44 towards the supply voltage VDD 40. On the other hand, the low side driver 36 may control the switching of the NFET driver 38 such that the NFET driver 38 pulls the output pin OUT 44 towards the ground supply GND. By appropriately controlling the switching of the PFET and the NFET drivers using the controller 24, the output voltage at OUT 44 may be controlled. Exemplary internal structures of the FET drivers and/or the high end and low end drivers are well known to those skilled in the art, and hence, a more detailed discussion is omitted herein. The controller 24 may receive feedback voltage Vout 78 through the feedback pin FB 52, and regulate the switching of the PFET and the NFET drivers such that Vout is substantially equal to the reference voltage Vref. In various embodiments, Vout may be proportional to the reference voltage Vref, i.e., Vout may be substantially equal to N*Vref, where N is a programmable constant.

In various embodiments, the on-chip regulator 10 may act as a down convertor, by generating output voltage (e.g., 1.2V or 2.5V) less than or equal to the supply voltage VDD (e.g., 5V). In various embodiments, the voltage regulator 10 may be utilized in a plurality of electronic systems. For example, in a hard disk drive (HDD), a motor controller may integrate one or more voltage regulators to provide regulated power supply to the motor controller and/or other components external to the motor controller (e.g., system-on-chip (SoC), preamplifiers, dynamic random access memory (DRAM) etc.).

The voltage regulator 10 may be suitable for numerous low power applications, where the power requirement of the load 76 is relatively low. But as the power requirement of the load 76 increases, the FET drivers (i.e., the PFET driver 34 and the NFET driver 38) may be needed to control relatively large current components. However, because of limited power and/or heat dissipation capabilities and/or limited current carrying capabilities of the FET drivers and/or chip 20, it may not always be possible to have on-chip FET drivers for high power applications. In these types of applications, in various embodiments, it may be possible to have external FET drivers, while other components of the regulator and the controller may still be inside an integrated circuit chip.

FIG. 2 illustrates another exemplary on-chip voltage regulator 100, included in an integrated circuit chip 120 and configured to be coupled to one or more external FET drivers. Similar to the voltage regulator 10 of FIG. 1, the voltage regulator 100 of FIG. 2 may be configured to supply regulated voltage to load 176, inductor 172 and/or capacitor 174, and may include a driver 128. The driver 128 may include a high side driver 132 and a low side driver 136.

However, unlike the voltage regulator 10 of FIG. 1, the voltage regulator 100 of FIG. 2 may not include any internal FET drivers (i.e., PFET drivers and/or NFET drivers). Instead, the voltage regulator 100 may be coupled to external FET drivers (high side PFET 134E and low side NFET 138E) that may be external to the voltage regulator and/or external to the chip 120. Thus, in various embodiments, the external FET drivers may be a part of the load 176, be a part of one or more external components (that is external to the chip 120), and/or may be stand alone FET drivers external to the chip 120. The high side driver 132 may control the switching of the external high side PFET 134E through a high gate pin HG 154, and the low side driver 136 may control the switching of the external low side NFET 138E through a low gate pin LG 156.

In various embodiments, the operation of the voltage regulator 100 may be similar to the voltage regulator 10 of FIG. 1. For example, the high side driver 132 may control the switching of the external PFET driver 134E (through pin HG 154) such that the PFET driver 34 drives the output pin OUT 144 towards the supply voltage 140. On the other hand, the low side driver 136 may control the switching of the external NFET driver 138E such that the NFET driver 138E pulls the output pin OUT 144 towards the ground supply GND. By appropriately controlling the switching of the external FET drivers using controller 124, the output voltage at OUT 144 may be controlled. The controller 124 may also receive feedback voltage Vout 178 through the feedback pin FB 152, and regulate the switching of the external PFET and the NFET drivers such that Vout is substantially equal to the reference voltage Vref.

The external FET drivers of FIG. 2 may have more power and/or heat dissipation capabilities and/or more current carrying capabilities as compared to the internal FET drivers of FIG. 1. Accordingly, in various embodiments, the voltage regulator 100 of FIG. 2 may be used for applications where there is a relatively higher power/load requirement. For example, the voltage regulator 100 may be used in high performance 2.5" mobile HDD, desktop 3.5" drives, enterprise drives, etc. In these applications, the regulator control may be integrated within a chip, whereas the FET drivers may be external to the chip.

Thus, FIG. 1 illustrates an on-chip voltage regulator 10 with internal FET drivers, whereas FIG. 2 illustrates another on-chip voltage regulator 100 where the FET drivers are not part of the chip. As previously discussed, the voltage regulator 10 may be suitable for relatively low power applications, whereas the voltage regulator 100 may be suitable for high power applications.

However, an IC chip may be used for a number of applications, with varying requirements of regulatory output capabilities. Moreover, the chip 20 of FIG. 1 (including the regulator 10) may not be used with external FET drivers. Similarly, the chip 120 of FIG. 2 (including the regulator 100) may not be used with external components that lack external FET drivers. Thus, it may be necessary to maintain two sets of IC chips: one with internal FET drivers (like FIG. 1) and the other without internal FET drivers (like FIG. 2), and only one of the two sets of chips may be used for a particular application, based on a configuration of external components (e.g., based on a presence or an absence of external FET drivers in the external components), in addition to being based on the power requirement of the load and/or the external components.

SUMMARY

In various embodiments, the present invention provides an apparatus and a method for self configuring voltage regulators. More specifically, there is provided, in accordance with various embodiments of the present invention, a voltage regulator comprising a first driver, a second driver, and a controller configured to control the first driver and the second driver to selectably operate in one of a plurality of operating modes, including an external driver mode and an internal driver mode, wherein which one of the plurality of operating modes is selected may be based on presence or absence of one or more external drivers. In various embodiments, wherein the voltage regulator may be included in a first component, and wherein the controller may be configured to detect a configuration of one or more external components coupled to the first component and is further configured to operate either in said external driver mode or in said internal driver mode responsive at least in part to said detection. The voltage regulator may be configured to detect a presence or absence of the one or more external drivers in the one or more external components. The controller may be configured to operate in said external driver mode responsive at least in part to detecting a presence of one or more external drivers in the one or more external components, and wherein the controller may be further configured to operate in said internal driver mode responsive at least in part to detecting an absence of an external driver in the one or more external components. The one or more external drivers that the voltage regulator is configured to detect may be external field effect transistor (FET) drivers. The first driver may be configured to output a first output voltage and the second driver may be configured to output a second output voltage, and the controller may be configured to control the first driver and the second driver such that the first output voltage and the second output voltage is substantially similar while the internal driver mode is engaged.

In various embodiments, the first driver may be configured to output the first output voltage to a first output pin and the second driver may be configured to output the second output voltage to a second output pin, and the first output pin may be coupled to the second output pin while the internal driver mode is engaged. The first output pin and the second output pin may be coupled to a third output pin while the internal driver mode is engaged, and the third output pin may be coupled to the controller and configured to supply a regulated output voltage to a load coupled to the third output pin. The first driver may include a first high side driver, a first p-channel field effect transistor (PFET) driver, a first low side driver, and a first n-channel field effect transistor (NFET) driver, and the second driver may include a second high side driver, a second PFET driver, a second low side driver, and a second NFET driver. The first high side driver may be configured to drive the first PFET driver, the second high side driver may be configured to drive the second PFET driver, the first low side driver may be configured to drive the first NFET driver and the second low side driver may be configured to drive the second NFET driver. The first driver may be configured to drive an external PFET driver and the second driver may be configured to drive an external NFET driver while the external driver mode is engaged. The first driver may be configured to drive the external PFET driver through a first output pin and the second driver may be configured to drive the external NFET driver through a second output pin. A third output pin of the voltage regulator may be coupled to the external PFET driver and the external NFET driver, and the third output pin may be coupled to the controller and configured to supply a regulated output voltage to a load.

In various embodiments, the voltage regulator may be included in a first component, and the controller may be configured to receive an output voltage as feedback from one or more external components coupled to the first component, to receive a reference voltage, and to control the first driver and the second driver such that the received output voltage is substantially equal to the reference voltage. The first component may be an integrated circuit chip.

There is also provided, in accordance with various embodiments of the present invention, a method for operating a voltage regulator included in an integrated circuit chip, the method comprising detecting a presence or an absence of one or more external drivers in one or more external components coupled to the integrated circuit chip, selecting one of an internal driver mode or an external driver mode responsive at least in part to said detection, and operating the voltage regulator in the selected one of the internal driver mode or the external driver mode. Said detecting the presence or absence of one or more external drivers may further comprise disabling a first driver included in the voltage regulator, driving a second driver such that an output of the second driver is low, measuring an output of the voltage regulator, and determining the presence or absence of one or more external drivers responsive at least in part to said measured output. In various embodiments, said detecting the presence or absence of one or more external drivers may further comprise determining that one or more external drivers are absent if the measured output of the voltage regulator is low, and determining that one or more external drivers are present if the measured output of the voltage regulator is high. The method may further comprise confirming said detection of presence or absence of the one or more external drivers, and confirming proper operation of a first driver and a second driver included in the voltage regulator. Said selecting the internal driver mode or the external driver mode may further comprise selecting the external drive mode if a presence of the one or more external drivers is detected, and selecting the internal driver mode if an absence of the one or more external drivers is detected.

In various embodiments, said operating the voltage regulator may further comprise operating, if the internal driver mode is selected, a first driver and a second driver included in the voltage regulator such that an output voltage of the first driver is substantially equal to an output voltage of the second driver, said operating the first driver and the second driver may further comprise driving a first p-channel field effect transistor (PFET) driver using a first high side driver, and driving a first n-channel field effect transistor (NFET) driver using a first low side driver. Said operating the first driver and the second driver may further comprise combining an output of the first PFET driver and the first NFET driver to produce the output voltage of the first driver, wherein the first high side driver, the first low side driver, the first PFET driver and the first NFET driver are included in the first driver. Said operating the first driver and the second driver may further comprise driving a second PFET driver using a second high side driver, driving a second NFET driver using a second low side driver, and combining an output of the second PFET driver and the second NFET driver to produce the output voltage of the second driver, wherein the second high side driver, the second low side driver, the second PFET driver and the second NFET driver are included in the second driver. Said operating the voltage regulator may further comprise operating, if the external driver mode is selected, a first driver and a second driver included in the voltage regulator such that an output voltage of the first driver controls an external p-channel field effect transistor (PFET) driver and an output voltage of the second driver controls an external n-channel field effect transistor (NFET) driver. The one or more external drivers that are to be detected may be external field effect transistor (FET) drivers.

There is also provided, in accordance with various embodiments of the present invention, a method comprising coupling a voltage regulator, included in a first component, to one or more external components, wherein the one or more external components are external to the first component, the external components including one or more loads to be driven by an output of the voltage regulator, selecting one of an internal driver mode or an external driver mode based at least in part on a configuration of the one or more external components, and operating the voltage regulator in the selected one of the internal driver mode or the external driver mode to supply a regulated voltage to the one or more loads. The method may further comprise detecting the configuration of the one or more external components by determining whether one or more external field effect transistor (FET) drivers are present in the one or more external components. Said selecting the internal driver mode or the external driver mode may further comprise selecting the external driver mode if one or more external FET drivers are present in the one or more external components, and selecting the internal driver mode if one or more external FET drivers are absent in the one or more external components.

In various embodiments, said operating the voltage regulator may further comprise operating, if the internal driver mode is selected, a first driver and a second driver included in the voltage regulator such that an output voltage of the first driver is substantially equal to an output voltage of the second driver. Said operating the voltage regulator may further comprise operating, if the external driver mode is selected, a first driver and a second driver included in the voltage regulator such that an output voltage of the first driver controls an external p-channel field effect transistor (PFET) driver and an output voltage of the second driver controls an external n-channel field effect transistor (NFET) driver, wherein the external PFET driver and the external NFET driver may be included in the configuration of the one or more external components. In various embodiments, said first component may be an integrated circuit chip.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
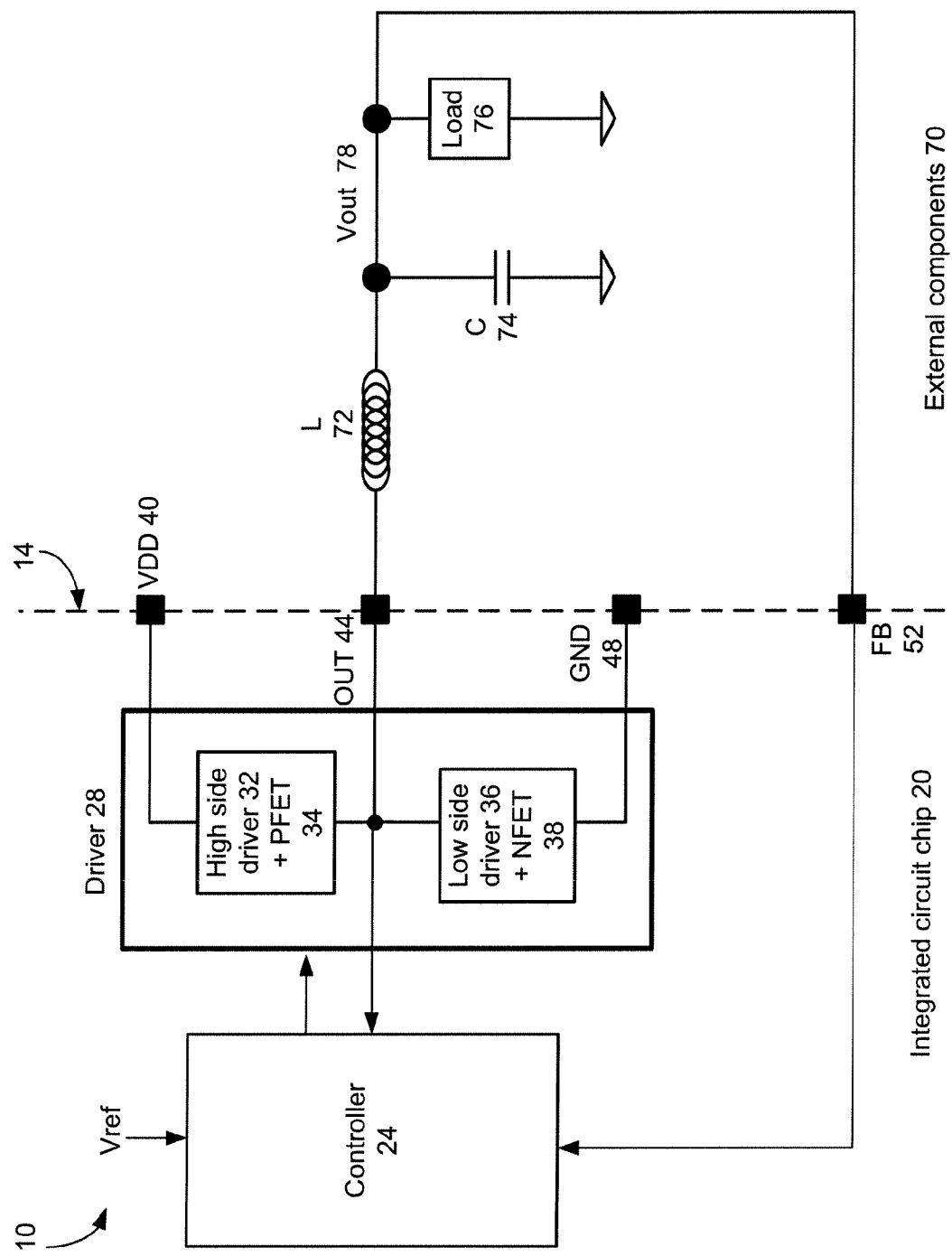
FIG. 1 illustrates an exemplary on-chip voltage regulator, along with internal field effect transistor (FET) drivers, included in an integrated circuit chip.
Figure 2:
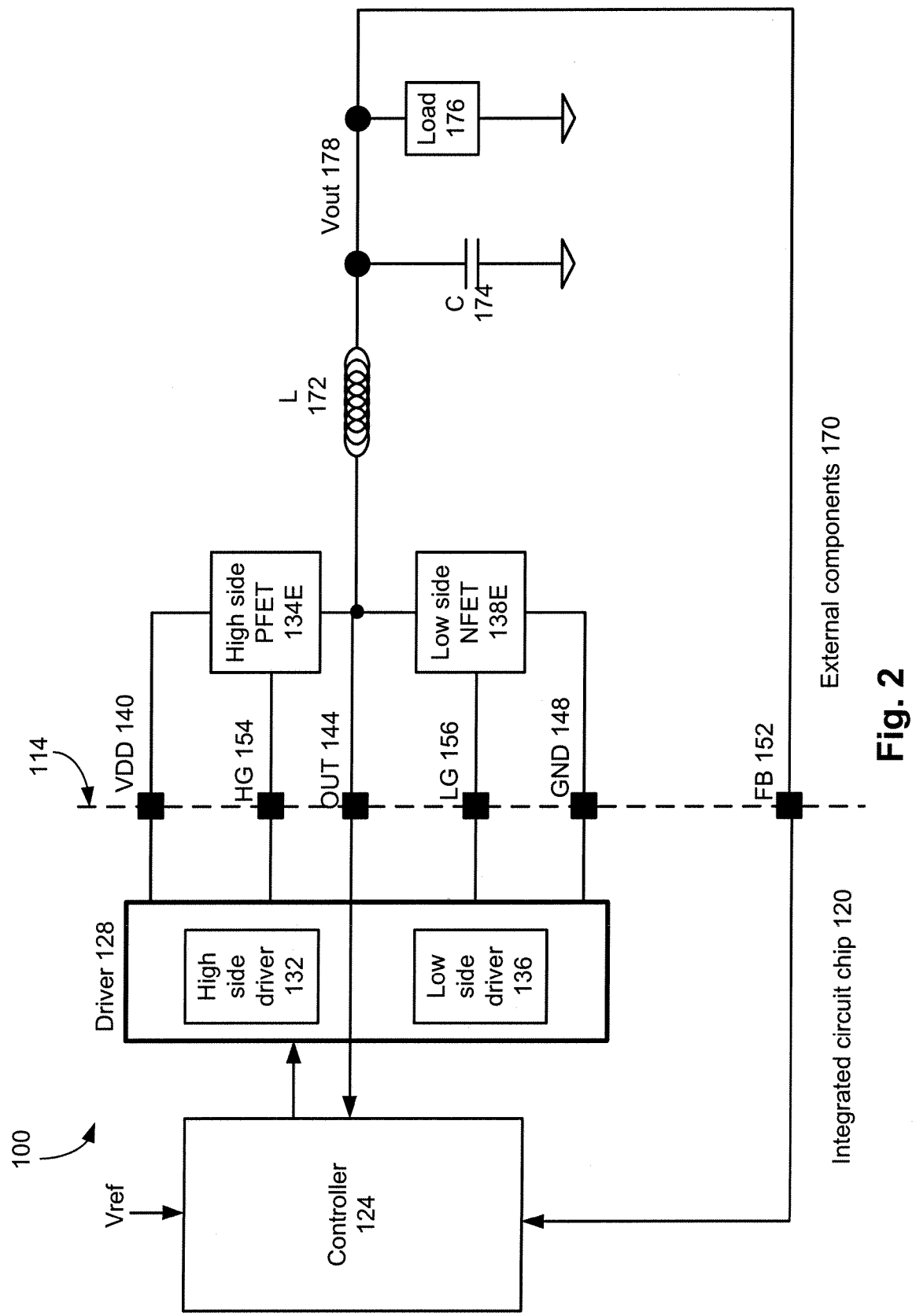
FIG. 2 illustrates another exemplary on-chip voltage regulator, included in an integrated circuit chip and configured to be coupled to one or more external FET drivers.
Figure 3:
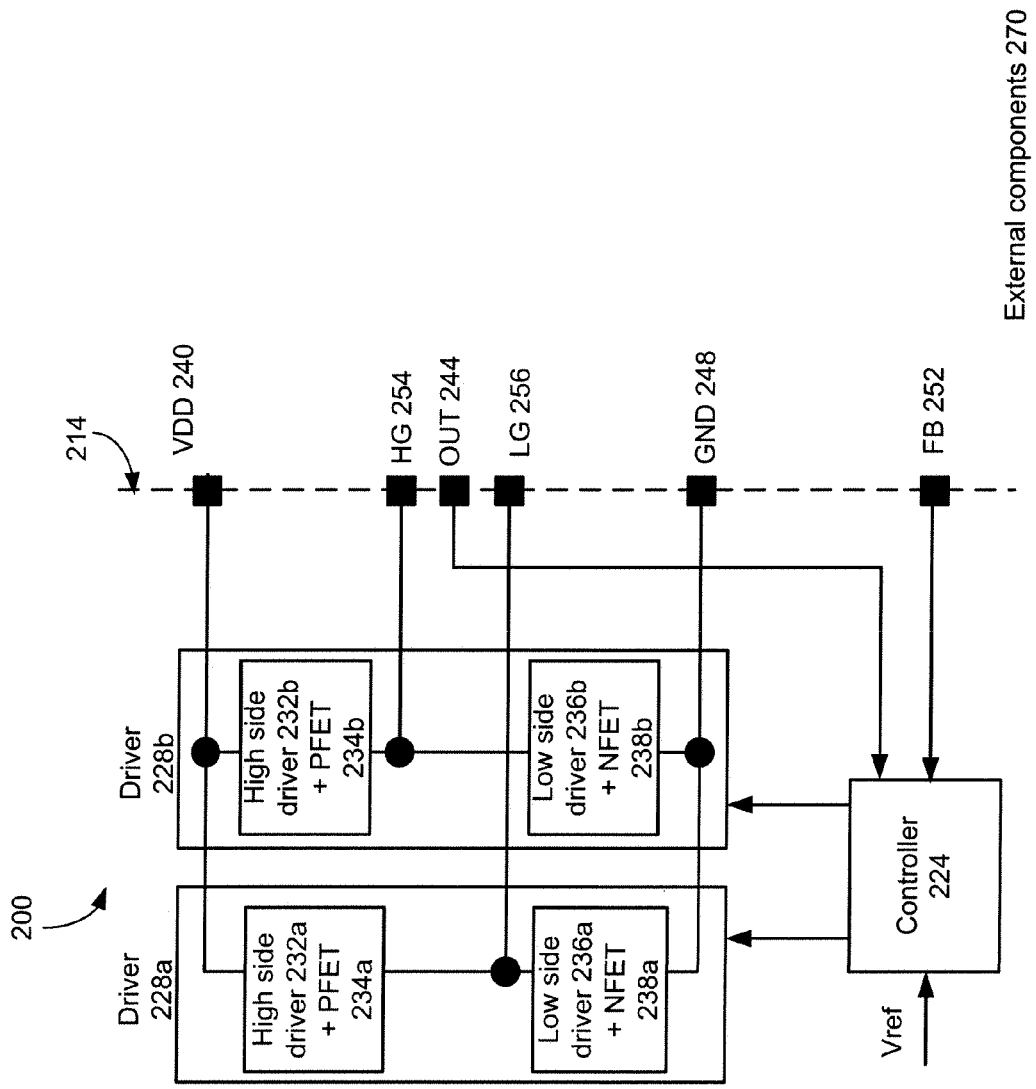
FIG. 3 illustrates an exemplary on-chip voltage regulator, included in an integrated circuit chip, in accordance with various embodiments of the present invention.

FIG. 3 illustrates an exemplary on-chip voltage regulator 200, included in an integrated circuit chip 220, in accordance with various embodiments of the present invention. The voltage regulator 200 may include two drivers: driver 228a and driver 228b. In various embodiments, each of the drivers 228a and 228b may include a high side driver, a high side PFET driver, a low side driver, and a low side NFET driver, as illustrated in FIG. 3. Thus, each of the drivers 228a and 228b may have some similarity with the driver 28 of FIG. 1.

In various embodiments, the high side drivers 232a and 232b and/or the PFET drivers 234a and 234b may be coupled to a supply voltage (e.g., 5V) pin VDD 240, while the low side drivers 236a and 236b and/or the NFET drivers 238a and 238b may be coupled to a ground pin GND 248. The output of the driver 228a may be coupled to a low gate pin LG 256, whereas the output of the driver 228b may be coupled to a high gate pin HG 254. The regulator 200 may also include a controller 224, which may be configured to control the operations of the drivers 228a and 228b, including the respective high side drivers 232a and 232b and/or the low side driver 236a and 236b. The controller 224 may be configured to drive the LG 256 and the HG 254 pin independently, through driver 228a and driver 228b, respectively. That is, the two drivers 228a and driver 228b may work independently to control the outputs of the pins LG 256 and HG 254.

In various embodiments, the voltage regulator 200 may be configured to detect the presence or absence of external FET drivers in one or more external components to which the chip 220 may be coupled, as will be further discussed in more detail herein. Additionally, based at least in part on the detection, the voltage regulator 200 may be configured so that it may operate either with external components that lack external FET drivers or with external components that include external FET drivers. That is, the voltage regulator 200 may be configured to operate with external components irrespective of the presence or absence of external FET drivers in the external components, as will be further discussed in detail herein.

Figure 4:
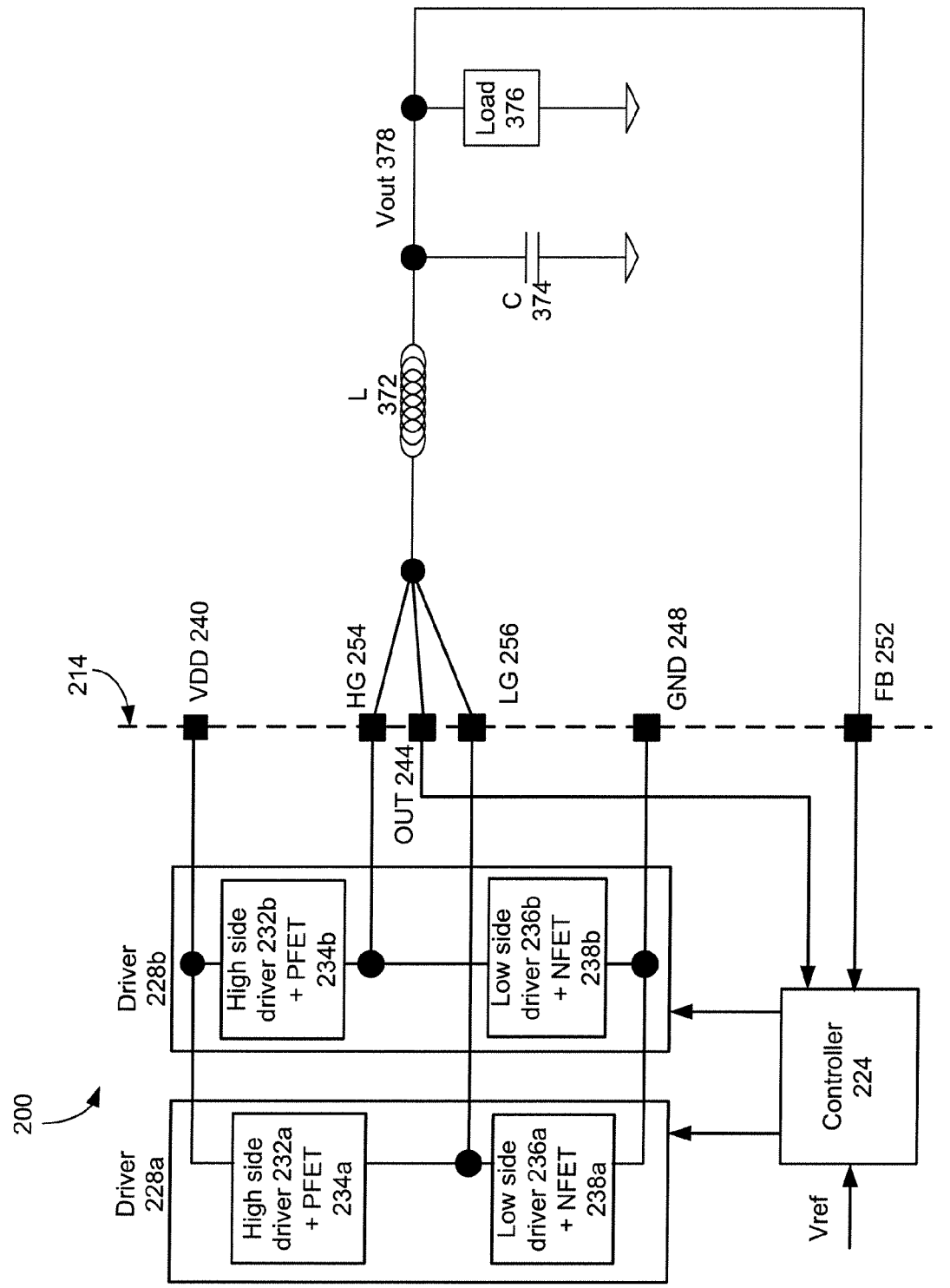
FIG. 4 illustrates the on-chip voltage regulator of FIG. 3 coupled to external components that lack any external FET driver, in accordance with various embodiments of the present invention.

FIG. 4 illustrates the on-chip voltage regulator 200 of FIG. 3 coupled to one or more external components 370 that lack any external FET driver, in accordance with various embodiments of the present invention. As the voltage regulator 200 in FIG. 4 is configured to operate with external components 370 that lack any external FET drivers, the voltage regulator 200 in FIG. 4 may be configured to utilize its internal FET drivers to regulate the output power supply. Thus, the mode of operation of the voltage regulator 200 in FIG. 4 may also be referred to as internal driver mode.

Referring again to FIG. 4, the LG 256, HG 254 and the OUT 244 pins may be shorted and coupled to a load 376 through inductor 372 and/or capacitor 374. As previously discussed, the controller 224 may be configured to drive the LG 256 and the HG 254 pin independently, through driver 228a and driver 228b, respectively. In the embodiments of FIG. 4, the driver 228a and driver 228b are driven in identical manner, such that both the drivers output identical voltage at respective pins LG 256 and the HG 254. Note that as will be readily understood by someone skilled in the art based on the disclosure and teachings provided herein, in various embodiments, the operating principles of each of the drivers 228a and 228b of FIG. 4 may be substantially similar to the operating principles of the driver 28 of FIG. 1. As drivers 228a and 228b are driven identically by the controller 224, the drivers 228a and 228b operate in tandem (in a parallel configuration), and the voltage regulator 200 may provide an output (e.g., 1.2V or 2.5V) with almost double the driving strength as compared to the voltage regulator 10 of FIG. 1.

Figure 5:
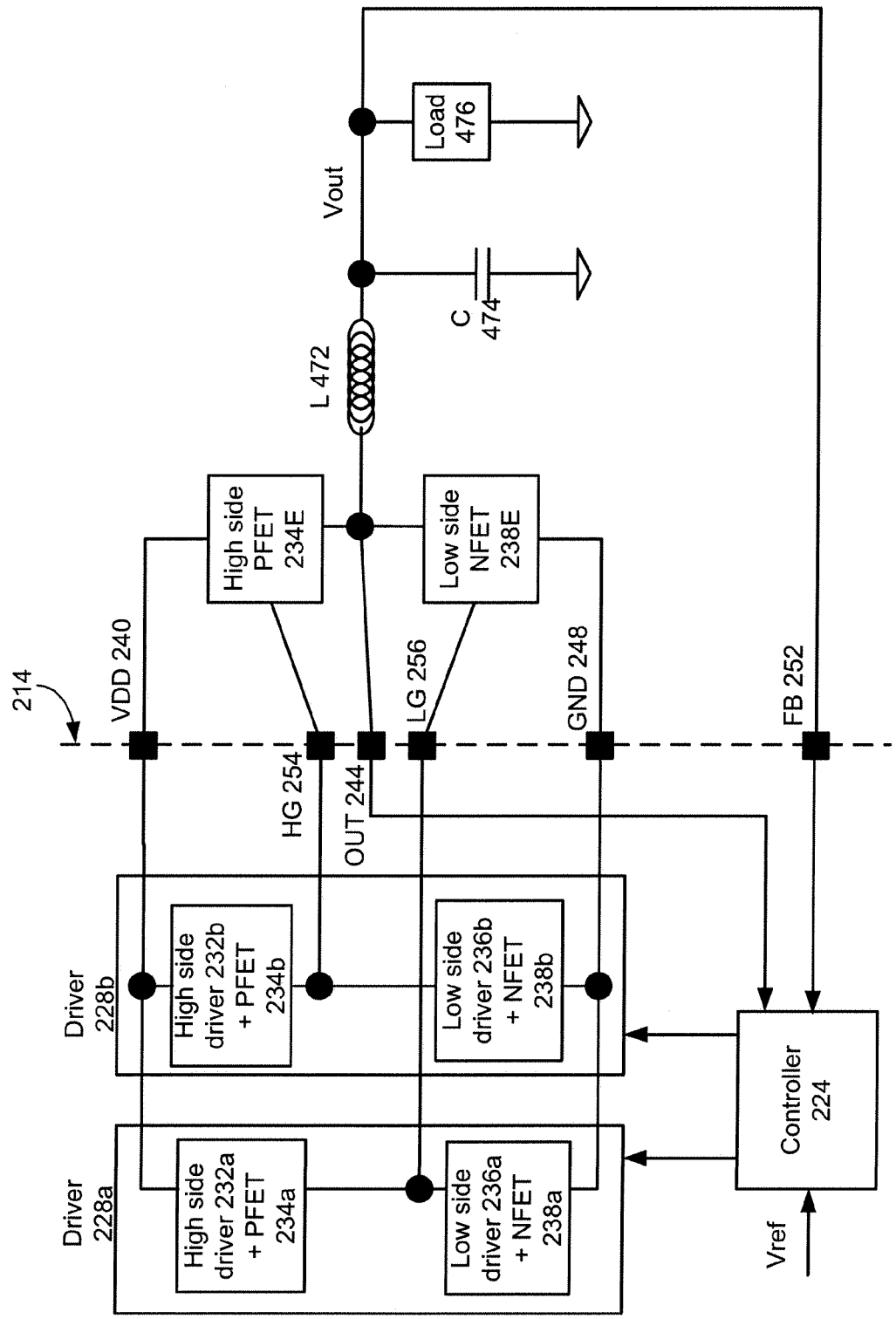
FIG. 5 illustrates the on-chip voltage regulator of FIG. 3 coupled to external components that include external FET drivers, in accordance with various embodiments of the present invention.

FIG. 5 illustrates the on-chip voltage regulator 200 of FIG. 3 coupled to one or more external components 470 that include external FET drivers, in accordance with various embodiments of the present invention. As the voltage regulator 200 in FIG. 5 is configured to operate with external FET drivers, the mode of operation of the voltage regulator 200 of FIG. 5 may also be referred to as external driver mode.

Referring again to FIG. 5, the external components 470 may include an external high side PFET driver 234E and an external low side NFET drive 238E. In various embodiments, the external PFET drive 234E may be coupled to the supply voltage VDD 240. On the other hand, the external NFET drive 238E may be coupled to the ground GND 248.

In various embodiments, as previously discussed, the driver 228b (including high and low side drivers 232b and 236b and/or the FET drivers 234b and 238b) may be configured to control the high gate pin HG 254, which may in turn control the switching of the external PFET 234E. The driver 228b may be configured to control the switching of the external PFET 234E such that the PFET 234E drives the output pin OUT 244 towards the supply voltage VDD 40. For example, in various embodiments, when driver 228b drives the pin HG 254 to low (e.g., equal to ground, 1.2V, or any other appropriate level of low voltage), the external PFET driver 234E may be turned ON, resulting in driving the output pin OUT 244 to a high voltage level (e.g., VDD).

On the other hand, as previously discussed, the driver 228*a* (including high and low side drivers 232*a* and 236*a* and/or the FET drivers 234*a* and 238*a*) may be configured to control the low gate pin LG 256, which may in turn control the switching of the external NFET 238E. The driver 228*a* may be configured to control the switching of the external NFET 238E such that the NFET 238E drives the output pin OUT 244 towards ground GND 248. For example, in various embodiments, when driver 228*a* drives the pin LG 256 to a high voltage (e.g., 2.5V, 5V, supply voltage VDD, or any other appropriate level of high voltage), the external NFET driver 238E may be turned ON and may drive the output pin OUT 244 towards ground GND 248

The controller 224 may control the operations of the external FET drivers 234E and 238E through respective drivers 228*a* and 228*b*, based at least in part on a reference voltage Vref and a feedback voltage Vout through the feedback pin FB 252. By appropriately controlling the switching of the external FET drivers 234E and 238E, the output voltage (e.g., 1.2V or 2.5V) at OUT 244 may be regulated such that a difference between the load voltage Vout and the reference voltage level Vref is minimized.

As seen from FIGS. 4 and 5, the voltage regulator 200 may operate either in the internal driver mode (FIG. 4) or in the external driver mode (FIG. 5), based at least in part on the configuration of the external components (i.e., presence or absence of external FET drivers in the external components) coupled to the chip 220. However, in order to operate in a correct mode (i.e., external or internal driver mode), the voltage regulator 200 may need to be aware of the configuration of the external components. Also, in various embodiments, as the voltage regulator may have to be powered before powering various other components (e.g., components, including a microprocessor, to which power may be supplied by the voltage regulator), it may not always be possible to detect the configuration of the external components during or before powering the voltage regulator.

In various embodiments, the voltage regulator 200 may be able to detect a presence (or absence) of external FET drivers, and configure itself accordingly. For example, if external FET drivers are detected, the voltage regulator 200 may configure itself to enter the external driver mode, as discussed with respect to FIG. 5. On the other hand, if an absence of external FET drivers is detected, the voltage regulator 200 may configure itself to enter the internal driver mode, as discussed with respect to FIG. 4.

Figure 6:
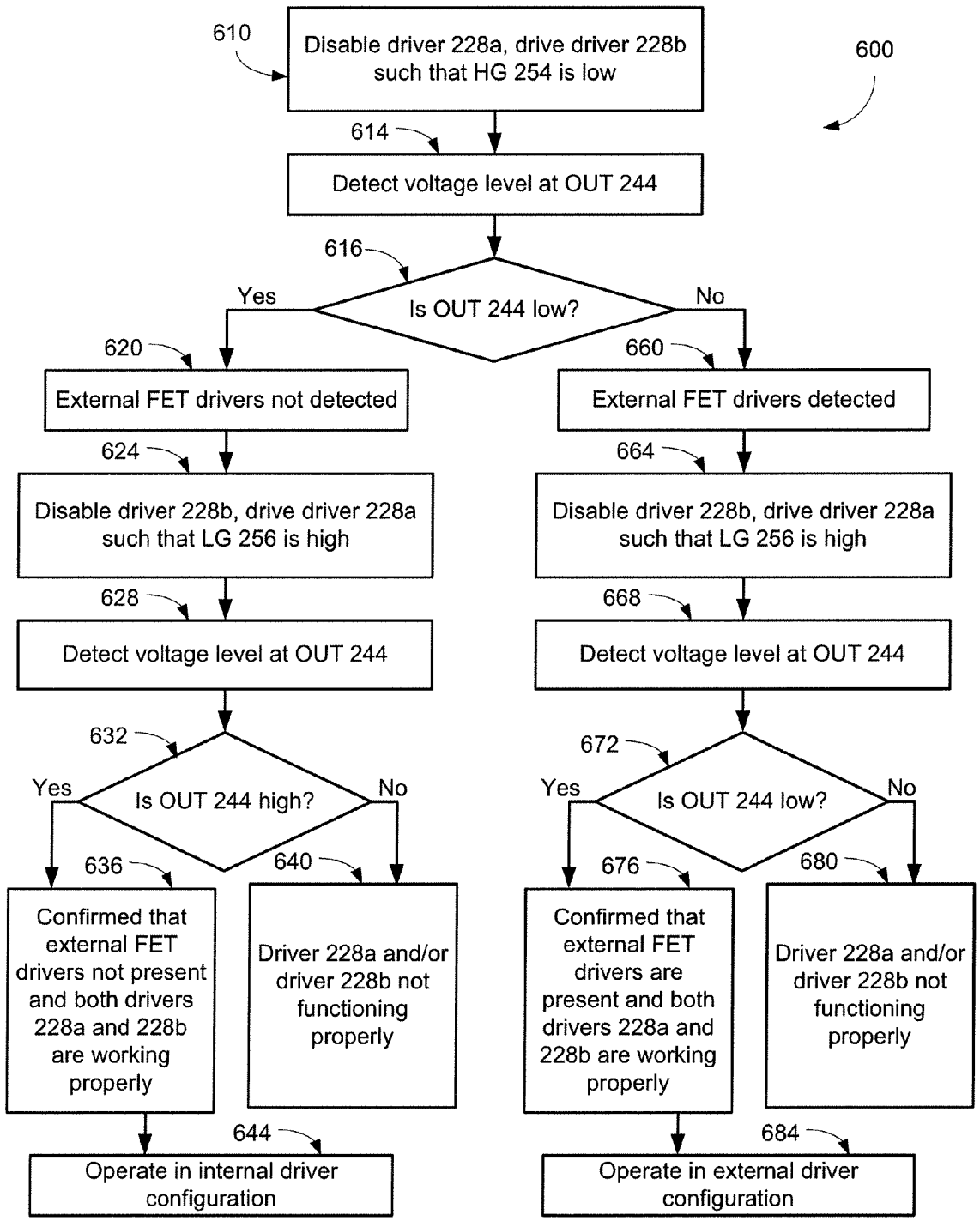
FIG. 6 illustrates an exemplary flow diagram for a method for detecting a presence (or absence) of external FET drivers, in accordance with various embodiments of the present invention.

FIG. 6 illustrates an exemplary flow diagram for a method 600 for detecting a presence (or absence) of external FET drivers, in accordance with various embodiments of the present invention. The method 600 may also be used to confirm that both the drivers 228*a* and 228*b* of the voltage regulator 200 are operating as intended, without any failure. The method 600 may be applicable to the voltage regulator 200 of FIGS. 3-5.

Referring to FIG. 6, initially, any one of the two drivers 228*a* and 228*b* of the voltage regulator 200 may be disabled, and the other one of the two drivers may be driven such that its output is either high or low. For example, in various embodiments, at 610, driver 228*a* may be disabled, and driver 228*b* may be driven such that HG 254 is low (e.g., ground voltage, 1.2V or any other appropriate low voltage level).

At 614, the voltage level of the OUT 244 pin may be detected. As illustrated in FIG. 4, if no external components are present, the OUT 244 and the HG 254 pin would be shorted by the external components. Accordingly, in the internal driver mode, if the voltage of HG 254 pin is low, the voltage of OUT 244 pin will also be low. On the other hand, as illustrated in FIG. 5 and as previously discussed, if external FET drivers are present and if the pin HG 254 is low, the external PFET driver 234E may be turned ON, resulting in driving the output pin OUT 244 at a high voltage level (e.g., 2.5V, 5V, supply voltage or any other appropriate level of high voltage).

Accordingly, at 616, if the OUT 244 is low, it may be determined, at 620, that external FET drivers have not been detected (i.e., absence of external FET drivers detected). On the other hand, if the OUT 244 is high, it may be determined, at 660, that external FET drivers are present.

Once the presence or absence of external FET drivers is detected, it may be intended to confirm the detection and/or confirm that both the drivers 228*a* and 228*b* are working properly. All or part of the remaining portion of the method 600 may be directed towards confirming the detection and/or confirming proper functioning of both the drivers 228*a* and 228*b*.

Referring again to FIG. 6, if presence of external FET drivers is not detected at 620, the driver 228*b* may be disabled at 624, and the driver 228*a* may be driven such that LG 256 pin is high. At 628, the voltage level at OUT 244 may be detected. The OUT 244 may be high (i.e., Yes at 632) if external FET drivers are not present and if both drivers 228*a* and 228*b* are properly functioning, because in that case, OUT pin 244 may follow the LG 244 pin as these two pins are shorted (see FIG. 4). Thus, at 636, the absence of external drivers and/or proper functioning of the drivers 228*a* and 228*b* may be confirmed, subsequent to which the voltage regulator 200 may operate according to the internal driver mode at 644, as has been previously discussed with respect to FIG. 4. If the OUT 244 is not high at 632 (i.e., No at 632), it may be an indication of malfunctioning of the driver 228*a* and/or driver 228*b* (or any other problem in the voltage regulator 200, the integrated circuit chip 220, and/or external components to which the chip 220 is coupled).

On the other hand, if presence of external FET drivers is detected at 660, at 664 driver 228*b* may be disabled and driver 228*a* may be driven such that the voltage of the pin LG 256 is high. As previously discussed with respect to FIG. 5, in the presence of external FET drivers, if LG 256 is high, the external NFET driver 238E may be turned ON and may drive the output pin OUT 244 towards low voltage (i.e., ground GND 248). Accordingly, if the OUT 244 is low at 672 (i.e., Yes at 672), the presence of external FET drivers may be confirmed, along with confirmation of proper functioning of both drivers 228*a* and 228*b*, subsequent to which the voltage regulator 200 may operate according to the external driver mode at 684, as has been discussed with respect to FIG. 5. On the other hand, if the OUT 244 is not low at 672 (i.e., No at 672), it may be an indication of malfunctioning of the driver 228*a* and/or driver 228*b* (or any other problem in the voltage regulator 200, the integrated circuit chip 220, and/or external components to which the chip 220 is coupled).

As will be apparent to those skilled in the art, selection of the driver for disablement at 610 is purely exemplary in nature. Additionally, selection of the voltage level during various operations of method 600 is also purely exemplary in nature. For example, at 610, HG 254 could have been driven to a high voltage (instead of a low voltage), accompanied by corresponding changes in other operations of method 600, as will be readily understood by those skilled in the art based on the disclosure and teachings provided herein.

The voltage regulator 200 of FIGS. 3-5 has several advantages over the prior art voltage regulators 10 and 100 of FIGS.

1 and 2, respectively. Unlike the prior art voltage regulators 10 or 100, the voltage regulator 200 may operate with external components irrespective of whether the external components include or lack external FET drivers. Thus, the voltage regulator 200 may be configured to be coupled to a load that has a relatively low power requirement (which usually lacks external FET drivers) or to a load that has a relatively high power requirement (which usually includes external FET drivers).

Figure 7:
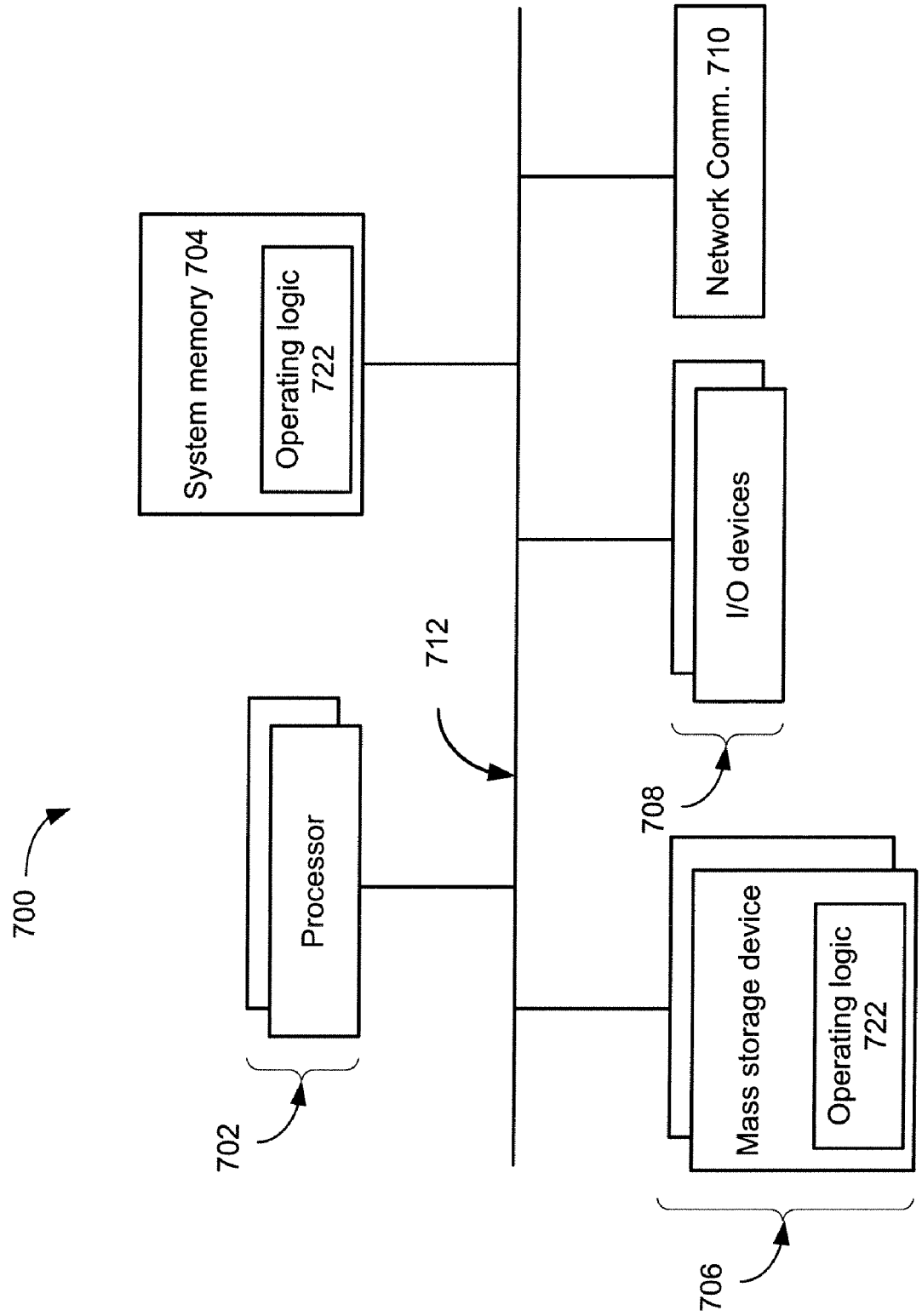
FIG. 7 is a block diagram of an exemplary system suitable for use to practice the present invention, in accordance with various embodiments.

FIG. 7 is a block diagram of an exemplary system suitable for use to practice the present invention, in accordance with various embodiments. As illustrated, system 700 includes one or more processors or processor cores 702, and system memory 704. For the purpose of this application, including the claims, the terms "processor" and "processor cores" may be considered synonymous, unless the context clearly requires otherwise. Additionally, system 700 includes mass storage devices 706 (such as diskette, hard drive, compact disc read only memory (CDROM) and so forth), input/output devices 708 and communication interfaces 710 (such as network interface cards, modems and so forth). The elements of FIG. 7 may be coupled to each other via system bus 712, which represents one or more buses. In the case of multiple buses, they may be bridged by one or more bus bridges (not illustrated).

Each of these elements performs its conventional functions known in the art. In particular, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having instructions 722 may be employed to distribute the instructions 722 and program various computing devices. The constitution of these elements 702-712 are generally well known, and accordingly will not be further described.

In various embodiments, the system 700 may include one or more integrated circuit chips, with one or more integrated voltage regulator, such as the voltage regulator 200 of FIGS. 3-5. For example, in the mass storage device 706, there may be included a hard disk drive (HDD), including a motor controller that may integrate one or more voltage regulators (e.g., voltage regulator 200 of FIGS. 3-5) to provide regulated power supply to the motor controller and/or other components external to the motor controller (e.g., processor 702, system-on-chip (SoC), preamplifiers, dynamic random access memory (DRAM), or any other components of system 700). In various embodiments, the voltage regulator may also be used in high performance 2.5" mobile HDD, desktop 3.5" drives, enterprise drives, etc. In various embodiments, the voltage regulator may be configured to operate either in an internal driver mode or an external driver mode, based at least in part of a configuration of external components coupled to the voltage regulator. The programming instructions stored in logic 722 and/or the processor 702 may be configured to control one or more operations of the voltage regulator.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A voltage regulator comprising:
   a first driver;
   a second driver; and
   a controller configured to control the first driver and the second driver to selectably operate in one of a plurality of operating modes, including an external driver mode and an internal driver mode, wherein which one of the plurality of operating modes is selected is based on presence or absence of one or more external drivers.

2. The voltage regulator of claim 1,
   wherein the voltage regulator is included in a first component; and
   wherein the controller is configured to detect a configuration of one or more external components coupled to the first component and is further configured to operate either in said external driver mode or in said internal driver mode responsive at least in part to said detection.

3. The voltage regulator of claim 2, wherein the voltage regulator is configured to detect a presence or absence of the one or more external drivers in the one or more external components.

4. The voltage regulator of claim 3, wherein the one or more external drivers that the voltage regulator is configured to detect are external field effect transistor (FET) drivers.

5. The voltage regulator of claim 2,
   wherein the controller is configured to operate in said external driver mode responsive at least in part to detecting a presence of one or more external drivers in the one or more external components; and
   wherein the controller is configured to operate in said internal driver mode responsive at least in part to detecting an absence of an external driver in the one or more external components.

6. The voltage regulator of claim 2, wherein the first component is an integrated circuit chip.

7. The voltage regulator of claim 1,
   wherein the first driver is configured to output a first output voltage and the second driver is configured to output a second output voltage; and
   wherein the controller is configured to control the first driver and the second driver such that the first output voltage and the second output voltage is substantially similar while the internal driver mode is engaged.

8. The voltage regulator of claim 7, wherein the first driver is configured to output the first output voltage to a first output pin and the second driver is configured to output the second output voltage to a second output pin; and
   wherein the first output pin is coupled to the second output pin while the internal driver mode is engaged.

9. The voltage regulator of claim 8,
wherein the first output pin and the second output pin is coupled to a third output pin while the internal driver mode is engaged; and
wherein the third output pin is coupled to the controller and is configured to supply a regulated output voltage to a load coupled to the third output pin.

10. The voltage regulator of claim 1,
wherein the first driver includes a first high side driver, a first p-channel field effect transistor (PFET) driver, a first low side driver, and a first n-channel field effect transistor (NFET) driver; and
wherein the second driver includes a second high side driver, a second PFET driver, a second low side driver, and a second NFET driver.

11. The voltage regulator of claim 10,
wherein the first high side driver is configured to drive the first PFET driver, the second high side driver is configured to drive the second PFET driver, the first low side driver is configured to drive the first NFET driver and the second low side driver is configured to drive the second NFET driver.

12. The voltage regulator of claim 1,
wherein the first driver is configured to drive an external PFET driver and the second driver is configured to drive an external NFET driver while the external driver mode is engaged.

13. The voltage regulator of claim 12,
wherein the first driver is configured to drive the external PFET driver through a first output pin and the second driver is configured to drive the external NFET driver through a second output pin;
wherein a third output pin of the voltage regulator is coupled to the external PFET driver and the external NFET driver; and
wherein the third output pin is coupled to the controller and is configured to supply a regulated output voltage to a load.

14. The voltage regulator of claim 1,
wherein the voltage regulator is included in a first component; and
wherein the controller is configured to receive an output voltage as feedback from one or more external components coupled to the first component, to receive a reference voltage, and to control the first driver and the second driver such that the received output voltage is substantially equal to the reference voltage.

15. A method for operating a voltage regulator included in an integrated circuit chip, the method comprising:
detecting a presence or an absence of one or more external drivers in one or more external components coupled to the integrated circuit chip;
selecting one of an internal driver mode or an external driver mode responsive at least in part to said detection; and
operating the voltage regulator in the selected one of the internal driver mode or the external driver mode;
wherein said detecting the presence or absence of one or more external drivers further comprises
disabling a first driver included in the voltage regulator,
driving a second driver included in the voltage regulator, such that an output of the second driver is low,
measuring an output of the voltage regulator,
determining the presence or absence of one or more external drivers responsive at least in part to said measured output,
determining that one or more external drivers are absent if the measured output of the voltage regulator is low, and
determining that one or more external drivers are present if the measured output of the voltage regulator is high.

16. The method of claim 15, wherein said operating the voltage regulator further comprises:
operating, if the internal driver mode is selected, the first driver and the second driver such that an output voltage of the first driver is substantially equal to an output voltage of the second driver.

17. The method of claim 16, wherein said operating the first driver and the second driver further comprises:
driving a first p-channel field effect transistor (PFET) driver using a first high side driver; and
driving a first n-channel field effect transistor (NFET) driver using a first low side driver.

18. The method of claim 17, wherein said operating the first driver and the second driver further comprises:
combining an output of the first PFET driver and the first NFET driver to produce the output voltage of the first driver, wherein the first high side driver, the first low side driver, the first PFET driver and the first NFET driver are included in the first driver.

19. The method of claim 16, wherein said operating the first driver and the second driver further comprises:
driving a second PFET driver using a second high side driver;
driving a second NFET driver using a second low side driver; and
combining an output of the second PFET driver and the second NFET driver to produce the output voltage of the second driver, wherein the second high side driver, the second low side driver, the second PFET driver and the second NFET driver are included in the second driver.

20. The method of claim 15, further comprising:
confirming said detection of presence or absence of the one or more external drivers; and
confirming proper operation of the first driver and the second driver included in the voltage regulator.

21. The method of claim 15, wherein said selecting the internal driver mode or the external driver mode further comprises:
selecting the external drive mode if a presence of the one or more external drivers is detected; and
selecting the internal driver mode if an absence of the one or more external drivers is detected.

22. A method for operating a voltage regulator included in an integrated circuit chip, the method comprising:
detecting a presence or an absence of one or more external drivers in one or more external components coupled to the integrated circuit chip;
selecting one of an internal driver mode or an external driver mode responsive at least in part to said detection;
operating the voltage regulator in the selected one of the internal driver mode or the external driver mode;
operating, if the external driver mode is selected, a first driver and a second driver included in the voltage regulator such that an output voltage of the first driver controls an external p-channel field effect transistor (PFET) driver and an output voltage of the second driver controls an external n-channel field effect transistor (NFET) driver.

23. The method of claim 22, wherein the one or more external drivers that are to be detected are external field effect transistor (FET) drivers.

24. A method comprising:
coupling a voltage regulator, included in a first component, to one or more external components, wherein the one or more external components are external to the first component, the external components including one or more loads to be driven by an output of the voltage regulator;
selecting one of an internal driver mode or an external driver mode based at least in part on a configuration of the one or more external components; and
operating the voltage regulator in the selected one of the internal driver mode or the external driver mode to supply a regulated voltage to the one or more loads;
wherein said operating the voltage regulator further comprises
operating, if the external driver mode is selected, a first driver and a second driver included in the voltage regulator such that an output voltage of the first driver controls an external p-channel field effect transistor (PFET) driver and an output voltage of the second driver controls an external n-channel field effect transistor (NFET) driver, wherein the external PFET driver and the external NFET driver are included in the one or more external components.

25. The method of claim 24, further comprising:
detecting the configuration of the one or more external components by determining whether one or more external field effect transistor (FET) drivers are present in the one or more external components.

26. The method of claim 24, wherein said selecting the internal driver mode or the external driver mode further comprises:
selecting the external driver mode if one or more external FET drivers are present in the one or more external components; and
selecting the internal driver mode if one or more external FET drivers are absent in the one or more external components.

27. The method of claim 24, wherein said operating the voltage regulator further comprises:
operating, if the internal driver mode is selected, the first driver and the second driver such that an output voltage of the first driver is substantially equal to an output voltage of the second driver.

28. The method of claim 24, wherein said first component is an integrated circuit chip.

* * * * *